Jan. 20, 1953 J. B. SEBOK 2,626,010
AIR CLEANER
Filed April 5, 1951 4 Sheets-Sheet 1
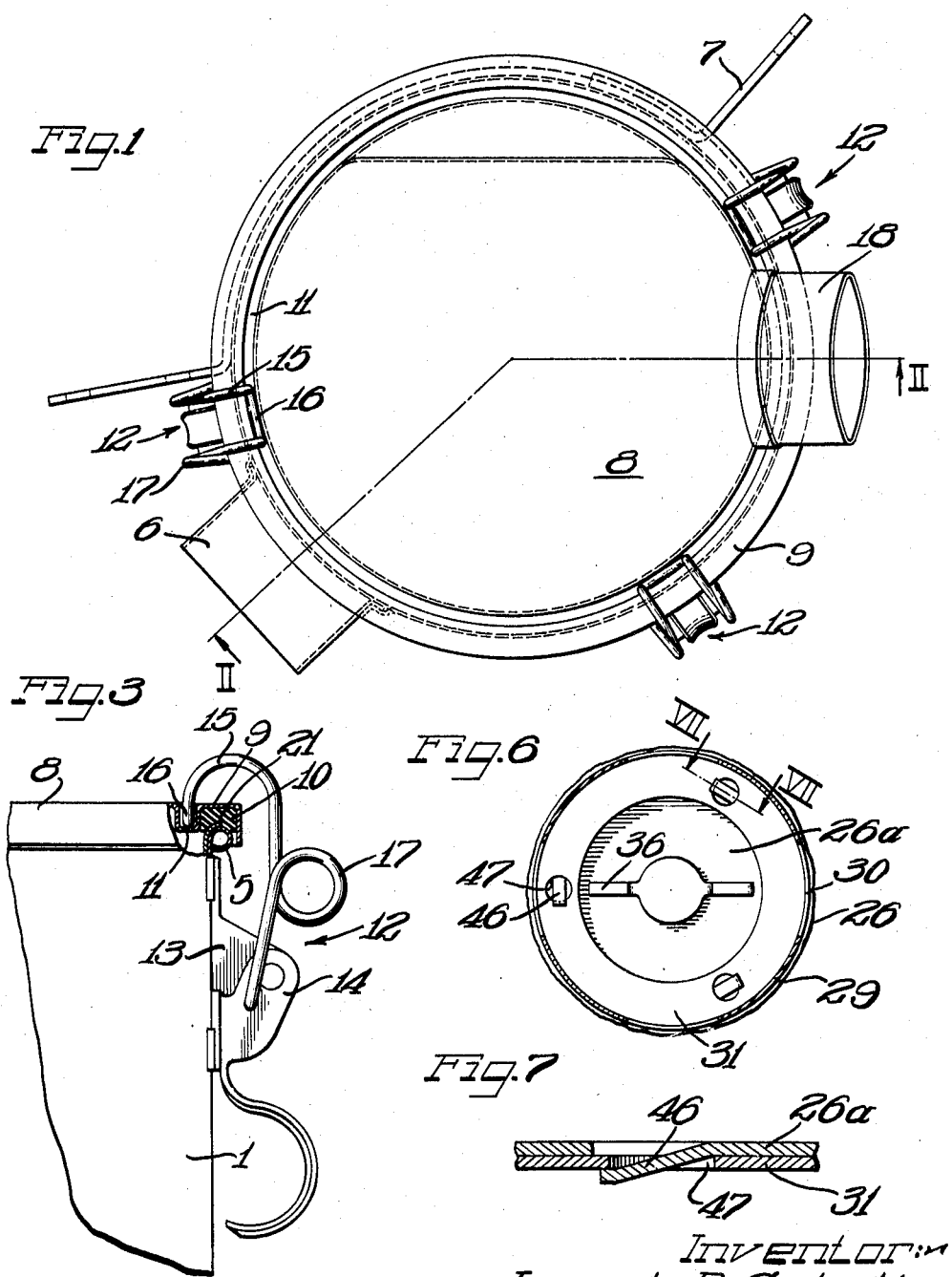
Inventor:
Joseph B. Sebok
by Hill, Sherman, Meroni, Gross & Simpson Attys

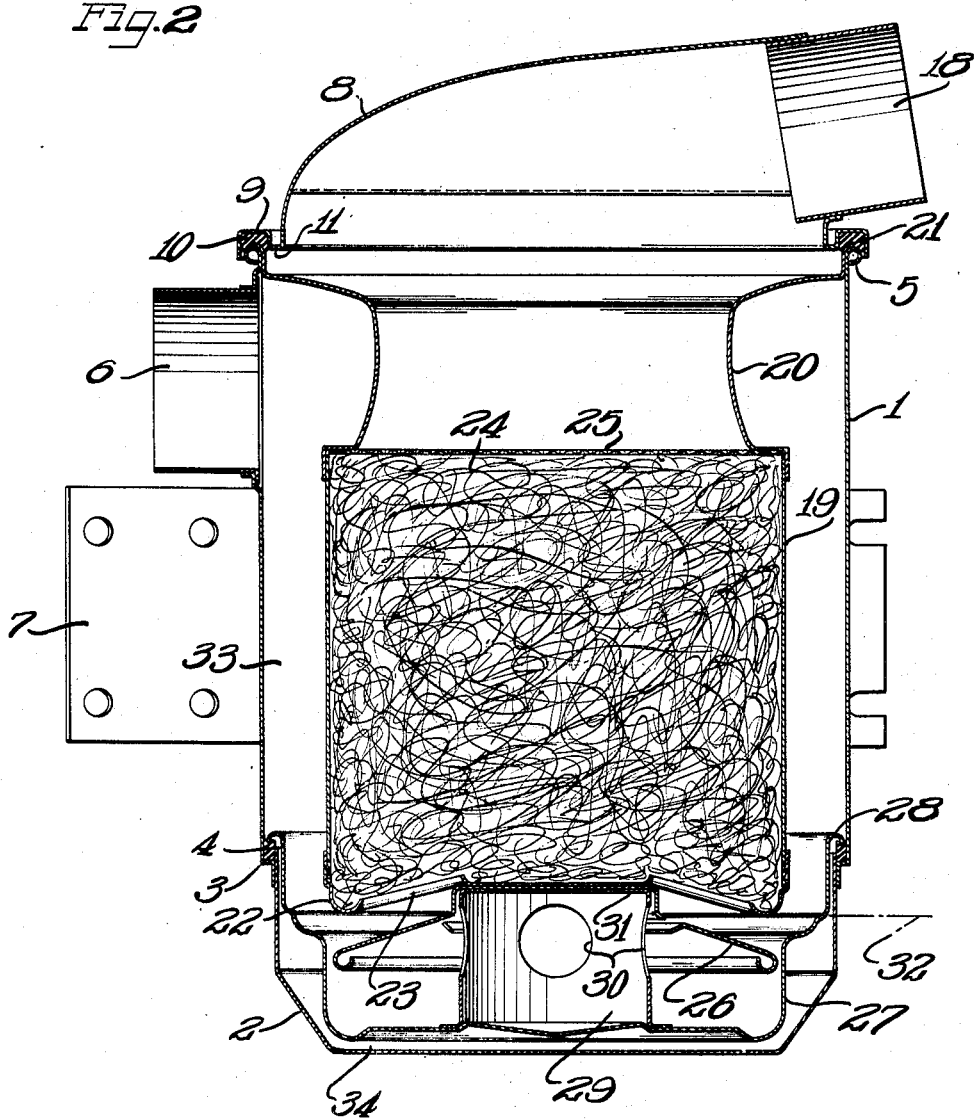

Jan. 20, 1953  J. B. SEBOK  2,626,010
AIR CLEANER

Filed April 5, 1951  4 Sheets-Sheet 3

Inventor:
Joseph B. Sebok
by Hill, Sherman, Merini, Gould & Simpson
Attys

Patented Jan. 20, 1953

2,626,010

UNITED STATES PATENT OFFICE 2,626,010

AIR CLEANER

Joseph B. Sebok, Detroit, Mich., assignor to Houdaille-Hershey Corporation, Detroit, Mich., a corporation of Michigan Application April 5, 1951, Serial No. 219,368

6 Claims. (Cl. 183—15)

This invention relates to improvements in an air cleaner, and more particularly to the type of air cleaner highly desirable for use in connection with the air intake of a carburetor associated with an internal combustion engine, although the invention will have other uses and purposes as with compressors, braking mechanisms, and other apparatus requiring a supply of clean air, as will be apparent to one skilled in the art.

The instant invention is not only highly suitable for use with various types of commercial, personal, and industrial automotive vehicles, but is also highly desirable for use in connection with military automotive vehicles.

Liquid bath air cleaners have proven most efficient for cleansing the air entering the carburetor of an automotive engine. Present day designs of automotive vehicles of all types leave very little room beneath the hood for the accommodation of an air cleaner, even an air cleaner without an intake silencing arrangement. In order to provide the necessary amount of air for the increasingly powerful engines now being developed, a liquid bath air cleaner must of necessity be fairly sizable. When mounted within the engine compartment of a vehicle, in some cases it is substantially impossible to properly service such an air cleaner by removing the liquid cup from the bottom of the cleaner. Further, military vehicles, as designed today, must be able to travel under water which means that the air cleaner must function while completely submerged.

In the past, many and various types of liquid bath air cleaners have been developed for automotive engines, but in no instance of which I am aware has there been an air cleaner, especially of the liquid bath type, that can be completely serviced from the top only, and in no instance of which I am aware has there been any air cleaner developed that will operate while submerged.

With the foregoing in mind, it is an important object of the instant invention to provide an air cleaner capable of satisfactory operation on an underwater vehicle.

Another object of this invention is the provision of a waterproof liquid bath air cleaner that may be submerged completely while operating.

A further object of the invention resides in the provision of an air cleaner of the liquid bath type, that may be completely serviced from the top only, such cleaner being especially suitable for installation where there is no room to permit bottom servicing.

A further feature of the invention is the provision of a liquid bath air cleaner including a casing of separable parts, and wherein only one seal performs both functions of sealing off the dirty air stream from the cleaned air stream, and rendering the entire structure watertight.

Another desideratum of the instant invention resides in the provision of a liquid bath air cleaner wherein the liquid sump or cup is removable from the outside casing along with the filter holding shell, and then detachable from that filter holding shell.

Another feature of the invention resides in the provision of a liquid bath air cleaner embodying a simple connection between the filter holding shell and the liquid cup, requiring no tools for the separation or joining of these parts.

Still a further object of this invention resides in the provision of a liquid bath air cleaner for under water use, wherein the liquid cup is shaped to effect a seal with the outside casing to preclude any loss of cleansing liquid outside of the cup in the event of backfire, and wherein the liquid cup is held down in sealing position by the filter structure thereabove.

It is also an object of the invention to provide a liquid bath air cleaner that may be serviced from the top, and wherein the liquid cup is separate from the filter holding shell and associated structure, but provided with means to facilitate its removal from the outside casing after removal of the filter holding shell.

Still a further feature of the invention resides in the provision of a liquid bath air cleaner for under water usage, so constructed that all permanently connected parts may be hydrogen brazed or equivalently secured together in a single pass through a brazing furnace.

While some of the more salient features, characteristics and advantages of the instant invention have been above pointed out, others will become apparent from the following disclosures, taken in conjunction with the accompanying drawings, in which—

Figure 1 is a top plan view of an air cleaner embodying principles of the instant invention;

Figure 2 is a vertical sectional view through the air cleaner, taken substantially as indicated by the staggered section line II—II of Fig. 1, looking in the direction of the arrows;

Figure 3 is a fragmentary part sectional part elevational view of the upper corner portion of the structure, illustrating the cover clamping means in elevation;

Figure 6 is a bottom plan sectional view, fragmentary in character, and taken substantially as indicated by the line VI—VI of Fig. 5; and Figure 7 is a greatly enlarged fragmentary vertical sectional view taken as indicated by the line VII—VII of Fig. 6.

As shown on the drawings:

Figure 4:
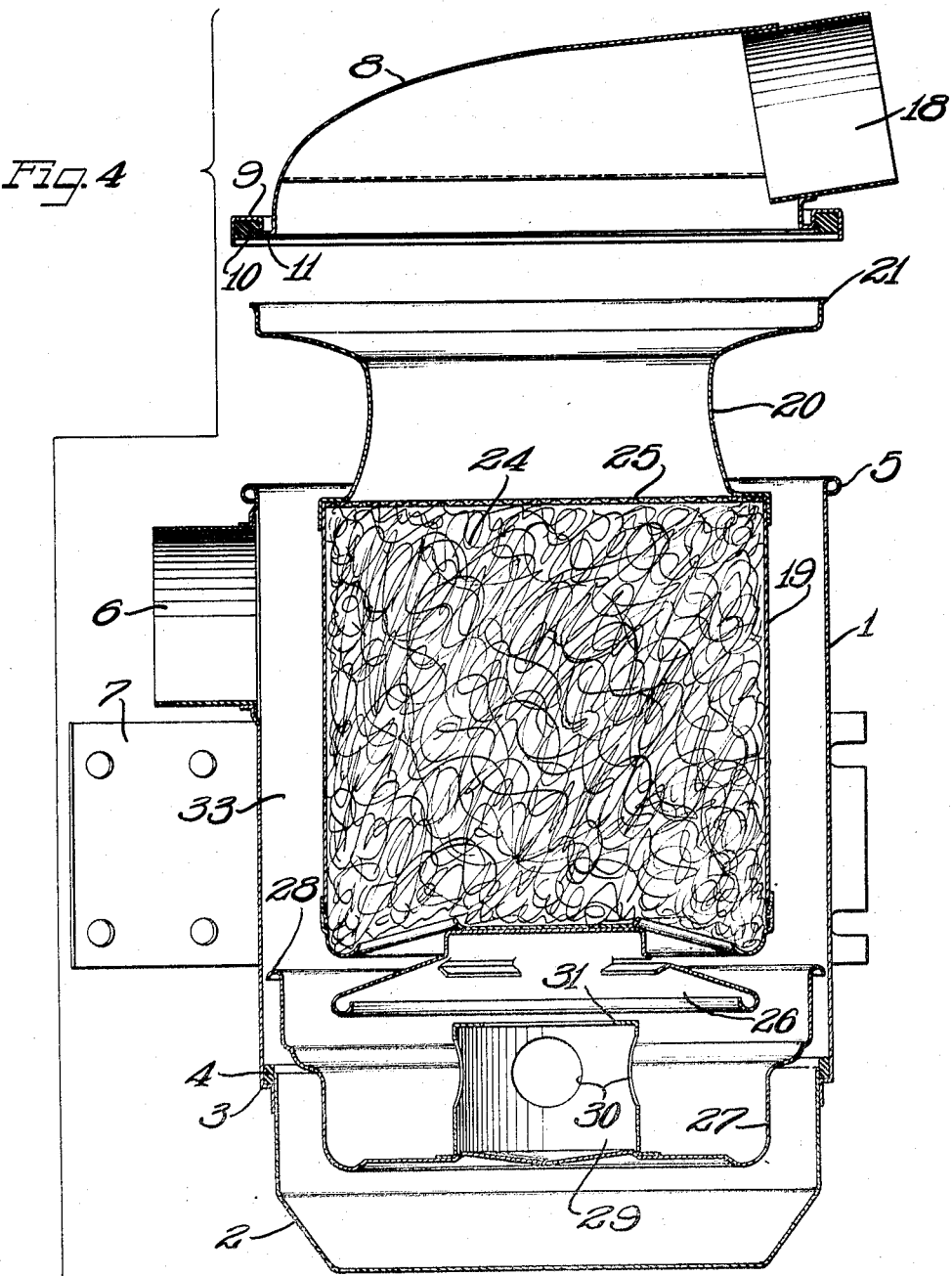
Figure 4 is an exploded vertical sectional view taken in the same location as Fig. 2 but showing the separator parts of the cleaner disconnected from each other.

In the illustrated embodiment of this invention, as seen in Figs. 1 to 4 inclusive, there is shown an outer fabricated casing 1, preferably, though not necessarily, of generally cylindrical shape. The body of the casing is initially separate from the bottom 2 and this body part is stepped in as indicated at 3, with the upper margin of the body 2 telescoping with the body there adjacent to provide a seat for an annular gasket 4. Where parts of this outer casing are connected together, and where other elements to be later described are attached thereto, the connections are preferably accomplished by hydrogen brazing, although they might be welded, or equivalently secured. Rivets and the like are preferably avoided, owing to the fact that the heads must be soldered around in order to insure that the casing is watertight.

As seen in Figs. 2 and 3, the upper margin of the casing 1 is rolled outwardly to provide an annular bead 5. Below this bead 5 the casing has an apertured flange, and an intake conduit 6 brazed or equivalently secured in place. This intake conduit 6 is for dirty air and when the cleaner is associated with the engine of an underwater vehicle, this conduit will be connected in an airtight manner with what is now commonly known as a snorkle tube or some other tube which extends vertically upwardly beyond the depth the vehicle may safely travel. Any suitable form of mounting bracket 7 may be attached to the outside surface of the casing 1, depending upon the requirements of the particular installation, and is attached preferably below the inlet 6.

A removable cover 8 is provided for the casing 1, and as seen clearly in Figs. 2 and 3, this cover is circumferentially channeled as indicated at 9 to hold an annular gasket 10 which, when the cover is mounted on the casing, rests on the aforesaid annular bead 5. Adjacent the channel formation 9, the cover is provided with an annular groove 11 to accommodate clamping means.

The cover is removably held to the casing by means of a plurality of overcenter clamping devices, generally indicated by numeral 12 in Fig. 1, which devices may be disposed in any suitable or desirable location. Each of these devices is of the same general character as seen in my prior Patent No. 2,401,322, issued June 4, 1946, although in the present instance the clamping devices are inverted with respect to the showing in the aforesaid patent. With reference to Fig. 3 it will be seen that a clamping device 12, in general, comprises a link 13 fixedly attached to the casing 1, and a handle link 14 pivotally connected to the fixed link. A generally U-shaped hasp member 15 has its outer end downwardly turned as at 16 to engage within the groove 11 in the cover, and the legs of this element are inwardly turned and connected to the handle link 14 which is of channel shape. Each leg has a spring roll 17 in an intermediate portion thereof, and the hasp element is preferably made of spring wire. It will thereupon be seen that when the end 16 of the hasp element is engaged in the groove 11, and the handle link 14 is moved downwardly to the position seen in Fig. 3, the cover is firmly held against the casing 1 with the gasket 10 sealing against the bead 5 to render the structure watertight.

An outlet conduit 18 is connected to the cover 8, and this conduit will in turn be connected in a watertight manner to the intake of the carburetor associated with the internal combustion engine, or to some other piece of apparatus requiring a supply of clean air.

Inside the casing 1 is a filter holding shell 19 provided with a hollow inwardly channeled top piece 20 which is outwardly flared as at 21 to seat on the aforesaid bead 5 on the outer casing 1 as seen best in Fig. 3. The bottom 22 of the filter holding shell 19 is secured to the lower margin of the shell in any suitable manner such as the tongue and hole arrangement seen in Fig. 2, and this bottom extends inwardly and is provided with an imperforate central portion around which is an annular series of large openings 23. Resting on the bottom inside the shell and generally filling the body portion of the shell is a filter mass 24 over the top of which is a screen or sheet of hardware cloth 25. The filter mass 24 may be of any suitable material, such as curled cattle tail hair, sisal or other vegetable fiber, waved wire or ribbon, or the equivalent. This filter holding shell also carries a baffle 26 depending therebelow and brazed or equivalently secured to the imperforate center portion of the bottom 22, this baffle functioning in the same manner as the similar baffle shown in my aforesaid Patent 2,401,322.

It will be noted that when the filter shell is mounted in position, the flanged mouth 21 of the top piece does not extend completely over the bead 5, but only partially thereover so that the gasket 10 will make an effective seal, both air- and watertight, between the flange 21 and the bead 5, as well as between the bead 5 and the cover 8. Dirty air enters through the intake 6, and clean air exits through the inside of the top piece 20, so the gasket 10 performs the double function of rendering the entire structure watertight and also sealing off the dirty air path from the clean air path.

In the lower portion of the outer casing 1 a liquid sump or cup 27 is removably disposed. The upper margin of this cup is turned outwardly and downwardly as indicated at 28 to provide a biting edge contact with the aforesaid annular gasket 4 so as to effect a seal between the cup 27 and the bottom 2 of the outer casing. Secured to the central region of the liquid cup 27 is an upstanding generally cylindrical element 29 provided with a plurality of relatively large apertures 30 through the side wall thereof and inwardly flanged as at 31 at the top. This flange seats against the central imperforate portion of the baffle 26, so that when the filter holding shell is placed in position, and the cover 8 clamped to the casing 1, the filter holding shell pushes downwardly on the liquid cup 27 to insure a positive seal between the rolled rim 28 and the gasket 4.

At the start of an operation, the cup 27 is filled with a suitable cleansing liquid, such as crankcase oil, to approximately the static level indicated by the dash-dot line 32 in Fig. 2. Air enters through the inlet 6, descends through the annular intake passage 33 between the filter holding shell and the outer casing, passes upwardly over the baffle 26, carrying some cleansing liquid therewith, and due to its contact with the cleansing liquid and the filter mass 24 is not only cleaned of impurities, but is also freed of entrained cleansing liquid before leaving the filter mass 24. The air passes upwardly through the filter mass, through the top piece 20, and exits through the outlet 18 to the device requiring clean air.

In the event of backfire through the carburetor of an engine or back pressure impulses from a compressor with which the cleaner may be associated, there wll be a reverse flow of air and a possible elevation of cleansing liquid up the inlet passage 33. By virtue of the seal between the turned margin 28 on the cup 27 and the gasket 4 none of this liquid can escape into a useless position in the space 34 between the outer casing bottom 2 and the cup 27, and the cleaner is never unintentionally depleted of cleansing liquid.

In the form of invention just described, the liquid cup 27 is separate from the filter holding shell and its associated parts, but as will more fully later appear herein, it may be removably attached to that structure if so desired.

With reference now to Fig. 4, it will be seen that the cleaner may be entirely serviced from the top. When the clamps 12 are released, by elevating the handle levers 14, the cover 8 may be lifted off the outer casing 1. Then the filter housing shell 19 together with the baffle 26 may be lifted out by grasping the top piece 20. Reaching into the shell and inserting his fingers in the apertures 30 of the upstanding cylindrical element 29 in the liquid cup 27, the operator may readily remove this liquid cup. There is no necessity whatever to do any work at the bottom of the outer casing 1, nor disturb the position of that casing in any manner to effect the servicing.

After removal, the liquid cup 27 may be emptied of its accumulated dirt and contaminated liquid, and replenished with the proper amount of new cleansing liquid, and then placed in position with its turned margin 28 seated on the gasket 4. The filter holding shell 19 may be swished through gasoline, kerosene, or some other cleansing liquid, to cleanse the filter mass 24, if so desired, then dried and replaced in the casing 1 with the flange 21 engaging the bead 5. After that the top 8 may be placed in position and the clamps adjusted to closed position. The adjustment of the clamps effects the seals at the gasket 10, and exerts some pressure on the filter holding shell so that it by such additional pressure and its own weight establishes a firm seal between the rolled margin 28 of the liquid cup and the gasket 4. The device is then ready for further operation.

In some instances, such for example as in military field use, spare parts are stocked and kept ready for use in connection with many mechanisms. Insofar as possible, it is desirable to have these spare parts of a universal nature so that the same parts will fit in several different devices. Should a user possess a number of spare filter units like that shown in my aforesaid Patent No. 2,401,322 and insist that those units be usable with the instant invention, rather than carry two different types of spare filter units, the instant invention must be capable of acccommodating them. To this end, I have illustrated in Fig. 5 a modified form of the instant invention capable of taking the filter unit of Patent No. 2,401,322.

The outer casing structure is the same as above described. In this instance, however, the filter unit includes a shell 19 having a bottom 22 with openings 23 therein just as above described, and a filter mass 24. The upper portion of the shell 19 is turned over the margin of the screen 25. The same baffle 26 is also used with the filter unit. A bolt 35 extends entirely through the filter unit, and at its lower end, outside the baffle, is provided with a winged head 36. By suitable washer means at each end thereof, such as the top washer 37, the filter unit is locked to the bolt so it cannot move longitudinally relatively to the bolt. The upper end of the bolt is threaded as at 38 in its projecting portion.

Such construction requires a different form of top piece from that previously described. In this instance, a fabricated top piece is utilized including a cup-like member 39 having a spider bottom 40 with large openings 41 therein, and to which a nut 42 is centrally affixed. The upper margin of this cup-like element 29 is flared outwardly as at 21 to seat on top of the bead 5 on the outer casing 1. An annular housing member 43 is brazed or equivalently secured to the element 39, is shaped or channeled to provide a seat for a gasket 44, and has a depending cylindrical flange 45 to telescopically receive the shell 19 of the filter unit. Since the filter unit is removable from the cup construction, the gasket 44 is necessary to prevent leakage of dirty air around the filter unit.

The filter unit may be disconnected by the simple expedient of turning the winged head 36 of the bolt, and unscrewing the threaded end 38 of the bolt from the nut 42, and replaced by an opposite operation. This structure functions the same as the previously described embodiment.

Figure 5:
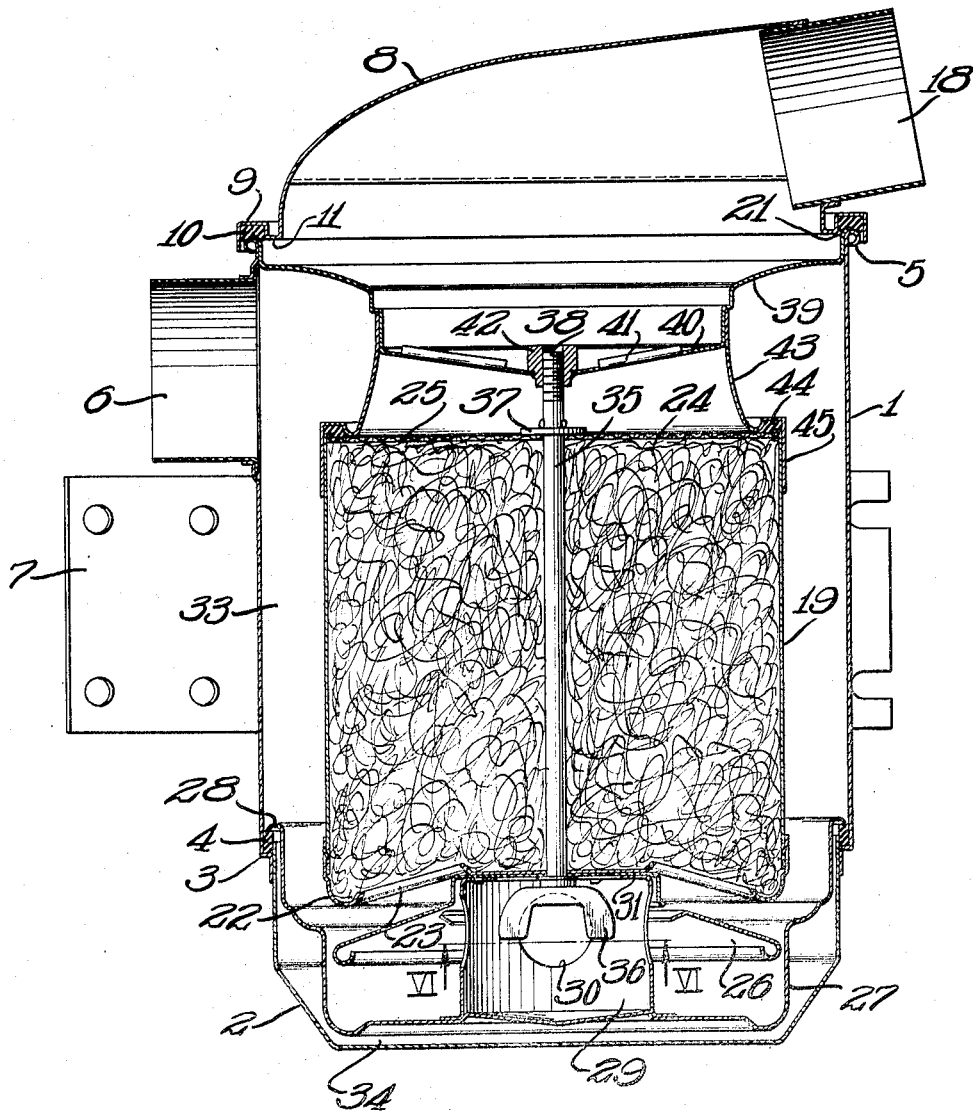
Figure 5 is a vertical sectional view of the same character and location as Fig. 2, but illustrating a cleaner embodying principles of the instant invention but having a somewhat different interior construction.

In Figs. 5, 6 and 7 I have also shown an arrangement whereby the oil cup 27 may be lifted out of the outer casing 1 along with the filter unit when servicing of the cleaner is required. It is to be distinctly understood that this arrangement, now about to be described, may also be utilized with the structure shown in Figs. 1 to 4 inclusive, if so desired. To this end, the imperforate central portion 26a of the baffle 26 is provided with a plurality of downwardly struck tongues 46. The inwardly turned flange 31 at the top of the cylindrical element 29 affixed to the bottom of the liquid cup 27 is provided with a similar number of apertures 47. It is a simple expedient, therefore, to place the flange 31 against the imperforate portion 26a of the baffle, and rotate the liquid cup 27 slightly until the tongues 46 interlock through the openings 47 with the flange 31 as shown clearly in Fig. 7.

With this arrangement, when the filter unit is lifted from the casing 1 for servicing, the liquid cup 27 travels along with it, and a simple slight twist of the cup relatively to this filter unit will serve to separate them after removal from the casing 1. The cup may be cleansed and replenished with cleaning liquid, and then attached to the filter unit or to the underside of the baffle, before these parts are replaced in the casing 1.

From the foregoing, it is apparent that I have provided a novel form of liquid bath air cleaner, which will operate efficiently when completely submerged, and which may be serviced entirely from the top of the cleaner in a simple and expeditious manner. Furthermore, it will be noted that an underwater cleaner of this character may be manufactured substantially as economically as previously known liquid bath air cleaners that will not function under water and require servicing from the bottom.

It will be understood that modifications and variations may be effected without departing from the scope of the novel concepts of the present invention.

I claim as my invention:

1. In an air cleaner, a casing including a body with a closed bottom and a removable cover, said casing having an inlet and an outlet, a liquid cup in said casing adjacent the bottom thereof, a filtering unit in the casing above said liquid cup, both said cup and unit being removable through the top of the casing body upon removal of said cover, and coacting means carried by the filter unit and cup for removably connecting the liquid cup to the filter unit for removal from and replacement in the casing therewith.

2. In an air cleaner, a casing including a body with a closed bottom and a removable cover, said casing having an inlet and an outlet, a gasket around the inside of said casing above the bottom thereof, a liquid cup having an outwardly turned margin to provide edge contact with said gasket with the cup depending therebelow and establish a liquidtight seal between the top of the cup and casing wall, and filtering means above said cup through which air must pass to said outlet.

3. In an air cleaner, a casing including a body with a closed bottom and a removable cover, said casing having an inlet and an outlet, a gasket around the inside of said casing above the bottom thereof, a liquid cup having an outwardly turned margin to provide edge contact with said gasket with the cup depending therebelow, and a filter unit above said cup through which air must pass to said outlet, said filter unit resting on a part of said cup to hold the cup in tight association with said gasket and establish a liquidtight seal between the top of the cup and the casing wall.

4. In an air cleaner, a casing including a body with a closed bottom and a removable cover, said casing having an inlet and an outlet, a tubular filter assembly suspended within said casing from the upper rim of the casing body, said assembly of less cross-sectional area than the casing below said rim to provide an air path around the assembly, an annular gasket inside said casing above the bottom thereof, a liquid cup having a turned margin to seat on said gasket with the cup depending therebelow, and means in said cup extending upwardly into contact with said assembly whereby said assembly forces the margin of said cup into tight association with said gasket to establish a liquidtight seal between the top of the cup and the casing wall.

5. In an air cleaner, a casing including a body with a closed bottom and a removable cover, said casing having an inlet and an outlet, a tubular filter assembly suspended within said casing from the upper rim of the casing body, said assembly being of less cross-sectional area than the casing below said rim to provide an air path around the assembly, an annular gasket inside said casing above the bottom thereof, a liquid cup having a turned margin to seat on said gasket with the cup depending therebelow, means in said cup extending upwardly into contact with said assembly whereby said assembly forces the margin of said cup into tight association with said gasket to establish a liquidtight seal between the edge of the cup and the casing wall, and releasable interlocking means between said cup and said assembly whereby the entire assembly and cup may be removed as a unit through the upper end of said casing body upon removal of said cover.

6. In an air cleaner for underwater service, a casing of elongated cup shape open at the top and sealed watertight therebelow, said casing having an air inlet through the side adjacent the top, a removable cover for said casing having an outlet for cleaned air, a removable liquid cup in said casing, means effecting a liquidtight seal between the upper edge of said cup and the casing wall, and air filtering means of less diameter than said casing above said liquid cup.

JOSEPH B. SEBOK.

REFERENCES CITED

The following references are of record in the file of this patent:

UNITED STATES PATENTS

| Number | Name | Date |
|---|---|---|
| 2,259,839 | McLeish | Oct. 21, 1941 |
| 2,457,321 | Russell | Dec. 28, 1948 |

FOREIGN PATENTS

| Number | Country | Date |
|---|---|---|
| 573,871 | Great Britain | Dec. 11, 1945 |